United States Patent
Moore et al.

(10) Patent No.: US 6,732,123 B1
(45) Date of Patent: May 4, 2004

(54) DATABASE RECOVERY TO ANY POINT IN TIME IN AN ONLINE ENVIRONMENT UTILIZING DISASTER RECOVERY TECHNOLOGY

(75) Inventors: David Wayne Moore, Morgan Hill, CA (US); Karen Alicia Ranson, San Jose, CA (US); Lawrence Edward Sullivan, San Jose, CA (US); Donald Prentiss Terry, San Jose, CA (US); Gregory Walter Vance, Fremont, CA (US); Vern Lee Watts, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/028,193

(22) Filed: Feb. 23, 1998

(51) Int. Cl.$^7$ ............................................... G06F 17/30
(52) U.S. Cl. .................... 707/202; 707/10; 707/205; 707/201; 714/20; 714/16
(58) Field of Search ................. 707/202, 200, 707/2, 201, 203, 8; 702/2; 711/115; 714/20, 16

(56) References Cited

U.S. PATENT DOCUMENTS

| | | | | |
|---|---|---|---|---|
| 5,043,866 A | * | 8/1991 | Myre, Jr. et al. ............ | 707/202 |
| 5,170,480 A | | 12/1992 | Mohan et al. ............... | 395/600 |
| 5,278,982 A | * | 1/1994 | Daniels et al. .............. | 707/202 |
| 5,280,611 A | * | 1/1994 | Mohan et al. | |
| 5,335,343 A | | 8/1994 | Lampson et al. .......... | 395/575 |
| 5,381,545 A | * | 1/1995 | Baker et al. ................ | 707/202 |
| 5,412,801 A | * | 5/1995 | de Remer et al. ............ | 714/20 |
| 5,440,727 A | * | 8/1995 | Bhide et al. ................. | 711/117 |
| 5,485,608 A | * | 1/1996 | Lomet et al. ................ | 707/202 |
| 5,504,861 A | | 4/1996 | Crockett et al. ....... | 395/182.11 |
| 5,524,241 A | * | 6/1996 | Ghoneimy et al. ........... | 707/10 |
| 5,555,371 A | | 9/1996 | Duyanovich et al. .. | 395/182.11 |
| 5,561,795 A | * | 10/1996 | Sarkar ......................... | 707/202 |
| 5,561,798 A | * | 10/1996 | Haderle et al. ............. | 707/202 |
| 5,581,750 A | * | 12/1996 | Haderle et al. ............. | 707/202 |
| 5,627,994 A | | 5/1997 | Levy et al. ................. | 395/477 |
| 5,630,047 A | | 5/1997 | Wang .................... | 395/182.13 |
| 5,640,561 A | * | 6/1997 | Satoh et al. ................. | 707/202 |
| 5,721,918 A | * | 2/1998 | Nilsson et al. .............. | 707/202 |
| 5,737,600 A | * | 4/1998 | Geiner et al. ............... | 707/200 |
| 5,764,877 A | * | 6/1998 | Lomet et al. .................. | 714/6 |
| 5,933,838 A | * | 8/1999 | Lomet ......................... | 707/202 |
| 5,946,698 A | * | 8/1999 | Lomet ......................... | 707/202 |
| 6,014,674 A | * | 1/2000 | McCargar .................... | 707/202 |

* cited by examiner

*Primary Examiner*—Jean M. Corrielus
(74) *Attorney, Agent, or Firm*—Sawyer Law Group LLP

(57) ABSTRACT

A method and apparatus for merging log data for recovering one or more database data sets to any point-in-time in a single pass of log data sets. Using disaster recovery technology, the invention may be implemented to provide a method to reduce the time that a broken database is unavailable by processing recovery input data in parallel and recovering multiple database data sets, including areas, simultaneously. The invention reduces operational complexity and resource constraints experienced by IMS customers trying to recover database data sets especially in a data sharing environment. The invention simplifies the recovery process by eliminating both the need for change accumulation and the need to run separate recovery jobs for each database data set requiring recovery, thereby reducing the impact of recovery on system resources.

28 Claims, 5 Drawing Sheets

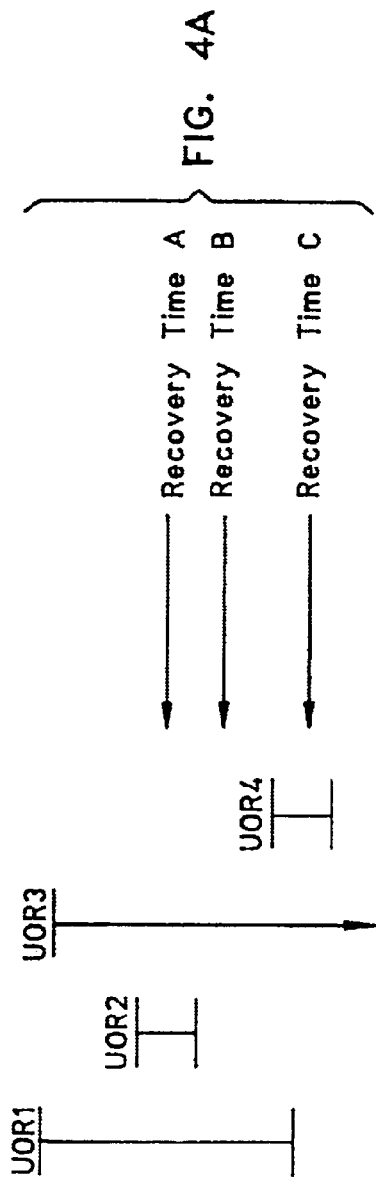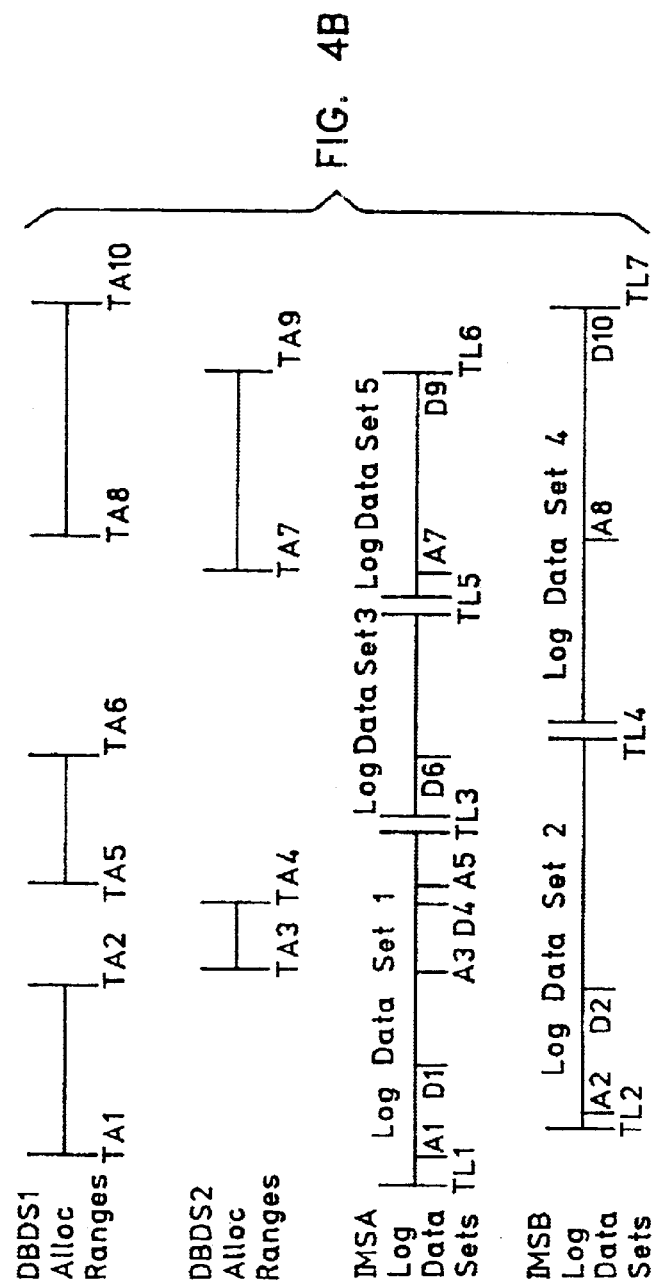

DATABASE RECOVERY TO ANY POINT IN TIME IN AN ONLINE ENVIRONMENT UTILIZING DISASTER RECOVERY TECHNOLOGY

BACKGROUND OF THE INVENTION

1. Field of the Invention

The present invention concerns the recovery of databases using log data sets from multiple database subsystems. More particularly, the invention relates to the merging of log data to recover database data sets to any point in time in a single pass of the log data.

2. Description of the Related Art

Data processing systems typically require a large amount of data storage. Customer data, or data generated by users within the data processing system, usually occupy a great portion of this data storage. Effective data processing systems also provide back-up copies of this user data to insure against a loss of such data. For most businesses any loss of data in their data processing systems is catastrophic, severely impacting the success of the business. To further protect customer data, some data processing systems extend the practice of making back-up copies to provide disaster recovery. In disaster recovery systems, a recovery copy of the customer data is kept in a location separate from the primary location. If a disaster strikes the primary storage location, the customer data can be "recovered" from the recovery copies located in the separate location.

In general, database activity is based on being able to "commit" updates to a database. A commit point is when database updates become permanent. Commit points are events at which all database updates produced since the last commit point are made permanent parts of the database. The span of time between commit points is referred to as a "unit of recovery" (UOR). If something goes wrong, such as a write error to the database, and the updates can not be made, all the updates produced since the last commit point are "aborted." It is as if the updates never happened.

There are various techniques to implement database updates and commit point processing. One way is for updates always to be applied to a database as they are produced. Copies of the database data from both before and after the change are written to a log. If the updates need to be aborted, the log record is retrieved and the copies of the unchanged database data are applied, in effect backing out the changes.

An alternate way to implement database updates and commit point processing is for the database manager to maintain the database changes in storage and not apply them to the databases until the commit point is reached. A copy of the database data that is changed is written to the log as the update is created. When the commit point is reached, and everything went as expected, the updates are written to the databases. If something went wrong, the storage containing the database updates is freed.

As database use has grown, customers have converted their computer operations to multiple shared system environments. In these environments, information management system (IMS) subsystems using multiple console support (MCS) consoles or extended MCS consoles have found wide use. The MCS consoles are used to receive messages and send data and commands across systems. In the event of a database failure, recovery is required to restore each shared database to a useful condition.

For example, one current method for recovery for these shared databases is to periodically run an IMS utility to accumulate changes to critical database data sets in a change accumulation data set. These change accumulation database data sets are used as input during database recovery. In order to create the change accumulation data, the change accumulation utility reads log data sets sequentially, that is, one after another. Typically, customers organize their multiple databases into change accumulation groups so that use of change accumulation operates as efficiently as possible. A customer can run change accumulation against one change accumulation group and use an optional secondary output—the set of log records that were not written to the change accumulation data set—as input to the change accumulation utility for the next change accumulation group to be processed. This can be done for each change accumulation group in which the current change accumulation run uses the secondary output of the previous change accumulation run. This serial process is managed directly by the customer. Customers usually run change accumulation periodically so that when a database data set in a change accumulation group requires recovery, the time required to run a final change accumulation job and subsequent database recovery job is minimized. This sequential recovery process is quite complex.

Furthermore, customers with large amounts of data to process have problems in addition to operational complexity when recovery is required using current sequential recovery methods. An additional problem arises because the data to be recovered is shared between multiple IMS subsystems. Change accumulation merges and sorts a set of log records so that updates can be applied to database data sets in sequence during recovery. However, as the amount of log data increases, so does the amount of system resources such as CPU time, storage utilization, secondary storage, elapsed clock time, etc., required for accumulating and sorting the updates read from the log data sets. In some cases, so much system resource is required that recovery adversely affects normal system and IMS activity. Running change accumulation while a database requires recovery can also take longer than a user can afford to have critical databases unavailable.

Additionally, certain types of errors can effect more than one database in ways that are not as obvious as a media failure. A customer may only know that as of a specific time, some action caused an error or errors that spanned multiple databases and rendered them unusable. For example, invalid data might have been entered by a system operator; a batch job may have been run more than once; or, an application program may have experienced an error which caused invalid data to be stored into multiple databases. Recovery from these types of errors is laborious, time consuming, and error prone. Typically, an earlier copy of the database data set is used as a base to restore the database to its state prior to the errors which occurred. Subsequent updates would then be applied to the database data set from records on log data sets.

Recovery of a database for these types of errors currently uses a technique referred to as time stamp recovery. Database updates are applied to a database from the time of the database back-up copy to a time when the database was taken off-line. The time the database was off-line may be hours or days prior to when the error occurred. This results in valid updates never being applied to the databases. The loss of this data using standard time stamp recovery techniques can be catastrophic to a customer's business and even more damaging than the unavailability of the database during the down time.

What is needed is a simplified database recovery method and apparatus that reduces the time that "broken" databases are unavailable. The method and apparatus should recover multiple database data sets simultaneously. The method and apparatus should further be able to recover database data sets to any user specified point in time to minimize the loss of data if a recovery to a time stamp is required to eliminate bad data from the database data sets. The method and apparatus should simplify the recovery process, reduce the time the databases are unavailable, and simplify day to day operation procedures. Preferably, change accumulation—creating compacted log data sets by eliminating records in the log not related to recovery of a specified set of database data sets, or merging multiple changes to a data object into a single change—and the need to run separate recovery jobs for each database data set requiring recovery would also be eliminated.

SUMMARY OF THE INVENTION

Broadly, the present invention concerns the merging of log data for recovering one or more database data sets in a single pass of the respective log data.

In one embodiment, the invention may be implemented to provide a method to reduce the time that a broken database is unavailable by processing recovery input data in parallel and recovering multiple database data sets simultaneously. It also reduces operational complexity and resource constraints experienced by IMS customers trying to recover database data sets in a data sharing environment. The invention simplifies the recovery process by eliminating both the need for change accumulation and the need to run separate recovery jobs for each database data set requiring recovery, thereby reducing the impact of recovery on system resources.

The invention performs recovery based upon a recovery list of database data sets. In one embodiment, recovery is started by a customer issuing a command and specifying a recovery list. The invention processes database data sets utilizing disaster recovery techniques such as IMS Remote Site Recovery (RSR) routing and database tracking components. These components are used in RSR to maintain and update remote copies of database data sets for use in case of a production site disaster. They can be used for database recovery purposes to maintain and update database data sets during the recovery process.

In one embodiment, the invention provides recovery to any point in time. All updates committed as of a user specified point in time are applied to the database data sets being recovered. The invention may provide an option to have the IMS assure that no database data set being recovered was allocated at the specified point in time. If desired, the invention can also notify a user if other database data sets are potentially inconsistent with database data sets processed using point in time recovery.

In yet another embodiment, the invention may be implemented to provide an apparatus to process log data sets in parallel and merge data recovery records required for recovery but generated by multiple IMSs. The apparatus may include a processor, storage, and related components and circuitry for processing the log and recovery data.

In still another embodiment, the invention may be implemented to provide an article of manufacture comprising a data storage device tangibly embodying a program of machine-readable instructions executable by a digital data processing device to perform method steps for processing log data sets in parallel and merging the data to recover multiple database data sets in a single pass of the log data sets.

The invention affords its users with a number of distinct advantages. One advantage is that the invention eliminates the need for change accumulation to be performed as part of the recovery process. Another advantage is that recovery of a database data set may be to any point in time. All updates committed as of a specific point in time are applied to the database data set being recovered. A further benefit is that the invention can identify to a user database data sets that are potentially inconsistent with database data sets processed by point in time recovery.

The invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein:

FIG. 4A shows units of recovery relative to various recovery times;

FIG. 4B illustrates allocation ranges for data sets in accordance with one embodiment of the present invention;

DESCRIPTION OF THE PREFERRED EMBODIMENTS

Hardware Components & Interconnections

Figure 1:
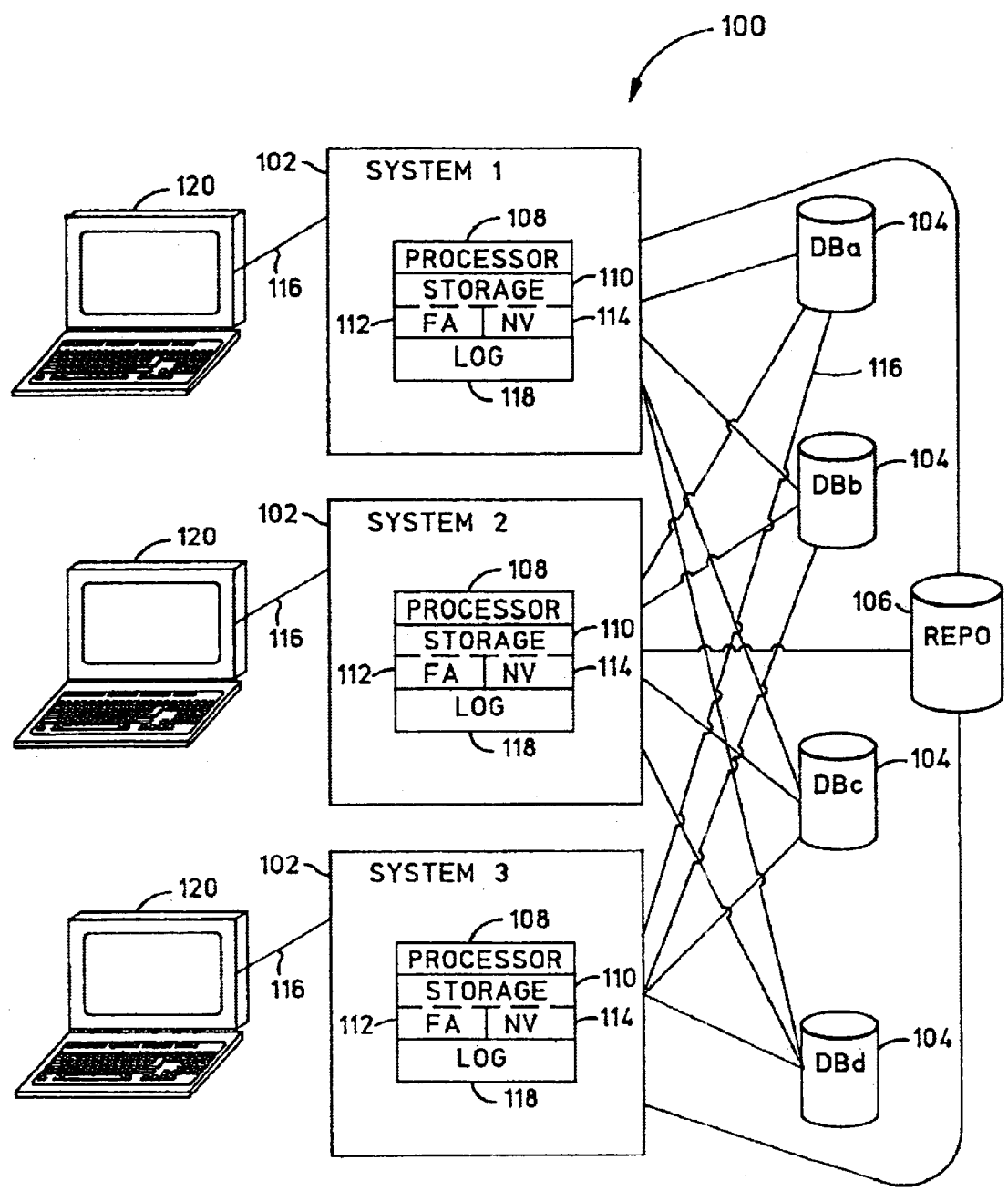
FIG. 1 is a block diagram of the hardware components and interconnections of a digital data processing machine for merging log data and recovering one or more database data sets in accordance with one embodiment of the invention.

One aspect of the invention concerns an apparatus to merge recovery log data to recover one or more database data sets, shared or unshared, in a single pass of log data sets, and which may be embodied by various hardware components and interconnections such as a digital data processing apparatus 100 as illustrated in FIG. 1. In discussing the various embodiments, reference to singular or multiple elements is not intended to restrict the invention to only that configuration stated.

As used in this application, database data sets may include areas. Areas refers to data locations that allow rapid access to direct-access data entry databases, for example, a "Fast Path" area in which message-driven programs and data entry database online utilities operate and data may be stored. With Fast Path, message processing may be grouped for load-balancing and synchronized for database integrity and recovery. This allows a designated transaction to be expedited for processing.

Digital Data Processing Apparatus

The digital data processing apparatus (apparatus) 100 may comprise one or multiple systems 102—designated in FIG.

1 as systems 1 through 3—coupled to one or more databases 104 marked as DBa through DBd and a repository of recovery related information (REPO) 106. The databases are preferably a hierarchial structured database, such as an information management system database, but may comprise a relational database in a separate embodiment. Throughout the application, reference to databases (DBs) 104 or database data sets 104 is used interchangeably.

The REPO 106 is used to store information required to recover lost data if a media failure or another type of inadvertent error occurs. For example, hardware within a system may unexpectedly fail or a user may have accidentally inputted defective data or instructions that led to inconsistency in one or more databases. The REPO 106 comprises data sets containing database recovery related information that may be specific to each database used in apparatus 100. Access to the data in REPO 106 may be coordinated by a database recovery controller (DBRC) 206 discussed below in relation to FIG. 2.

A system 102 may include a processor 108, such as a microprocessor, a general purpose programmable device, application specific hardware, a state machine, or other processing machine, coupled to storage 110. In the present example, storage 110 includes a fast-access memory 112 and nonvolatile storage 114. The fast-access memory 112 may comprise random access memory, and may be used to store the programming instructions executed by the processor 108 during such execution. The nonvolatile storage 114 may comprise, for example, one or more magnetic data storage disks such as a "hard drive", a tape drive, or any other suitable storage device. A system 102 also includes input/output communication connections such as lines 116; however, line 116 may also be a bus, cable, electromagnetic link, or any other means for exchanging data with the components of each system 102.

A system 102 commonly includes a log 118 for tracking updates to data kept in storage 110 or in a database 104. The log 118 is used for tracking changes made by its respective system to data. These changes are stored on the log 118 as log records. A system 102 may also be connected to an interface unit 120, shown in FIG. 1 as a visual display and keyboard. The unit 120 is used to convey information to a user of the system 102 to which it is connected, and may also be used for communicating data and commands to the system 102. As such, the interface unit 120 may include a keyboard, touch screen, mouse, microphone, array of buttons, electromagnetic sender and receiver, a standard video display, speakers, or any other means for exchanging data with the system 102.

Figure 2:
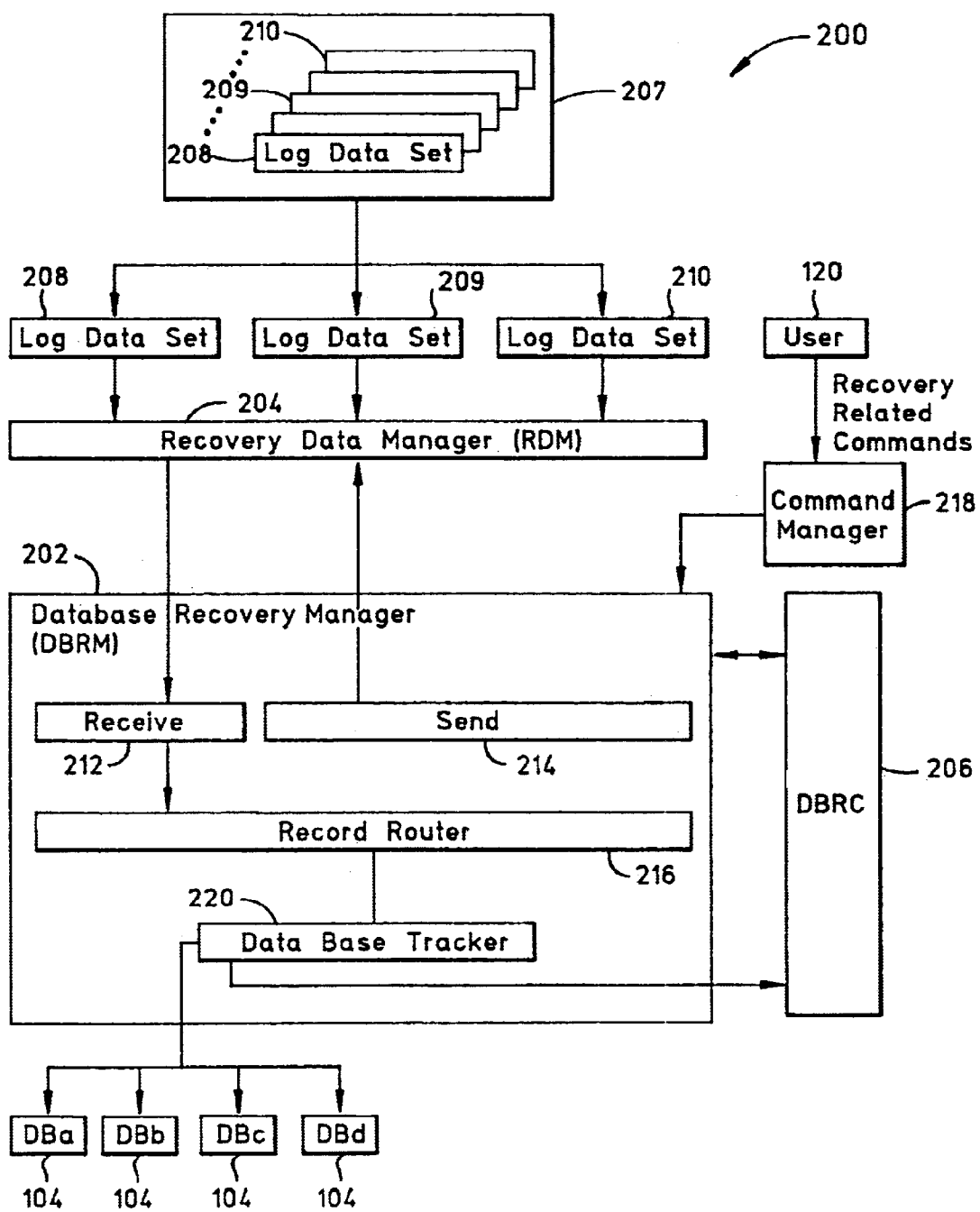
FIG. 2 is a logic block diagram for the digital data processing machine shown in FIG. 1 and in accordance with one embodiment of the invention.

FIG. 2 shows one logical configuration 200 for recovering data to restore a database. This configuration, referred to as Database Recovery (DR) 200, is discussed in relation to the apparatus 100 shown in FIG. 1 and logically includes various components included in apparatus 100 as discussed below. However, discussion of implementing DR 200 with respect to apparatus 100 is not intended as a limitation. DR 200 may be implemented in various apparatus configurations of which apparatus 100 is but one example.

DR 200 may comprise a database recovery manager (DBRM) 202, a recovery data manager (RDM) 204, and a DBRC 206. The DBRM 202 may be included in the command manager 218 or exist as a separate hardware or software component of system 102. In another embodiment, the DBRM 202 may be integral to one or multiple databases 104, and manages the physical recovery of database data sets.

The RDM 204 may be similarly situated within the apparatus 100, and in one embodiment, operates in an address space separate from DBRM 202. The RDM 204 restores image copies, reads log data sets, and presents a recovery data stream to the DBRM 202. A recovery data stream is a set of log records required to recover a specific set of database data sets. As discussed below, records in a recovery data stream are merged in creation-time sequence. The DBRC 206 maintains the status for recovery related resources. This status may be stored in REPO 106 shown in FIG. 1 and accessed during recovery of a database.

The DBRM 202 includes a record router (router) 216. The router 216 processes log records from the recovery data stream and presents them to the tracker 220 depending on where the record is to be directed. The tracker 220 coordinates and updates the database data sets referenced by the log records. Database trackers and their implementations are more fully discussed in U.S. Pat. No. 5,170,480, "Concurrently Applying Redo Records to Backup Database in a Log Sequence Using Single Queue Server Per Queue At A Time", filed Sep. 25, 1989, assigned to the assignee of the present invention, and incorporated by reference herein.

Recovery of database data sets by DR 200 depends on recovery information recorded in data sets stored in REPO 106. Database data sets to be recovered may be specified in a recovery list by designating one or more database data sets, designating entire databases for recovery, or designating groups as defined in REPO 106 for recovery. These groups may comprise, for example, database data set groups or other types of database groups.

As part of the recovery processing in one embodiment, DBRC 206 validates the database data sets in REPO 106 that are to be added to the recovery list. In another embodiment, if a database data set, or group is unknown to DBRC 206, message indicating the condition is issued by the DBRM 202. If a database is being accessed by one or more systems 102, a message is issued by the DBRM 202. The user must ensure that recovery is not started until all database data sets being recovered are offline to all systems 102. Database data sets in the recovery list that are allocated to active systems 102 will not be recovered. In one embodiment, a message notifying the user of such a situation may be issued by DBRM 202 identifying each of the database data sets not recovered.

Despite the specific foregoing description, ordinarily skilled artisans having the benefit of this disclosure will recognize that the DR 200 discussed above may be implemented in a machine of different construction, without departing from the scope of the invention. As a specific example, one of the databases 104 may be eliminated; furthermore, the storage 110 may be provided on-board the processor 108 or a command manager 218, even though depicted separately in FIGS. 1 and 2.

Operation

In addition to the various hardware embodiments described above, a different aspect of the invention concerns a method to manage merging of recovery log data for recovering one or more database data sets in a single pass of the log data sets.

Overall Sequence of Operation

Figure 3:
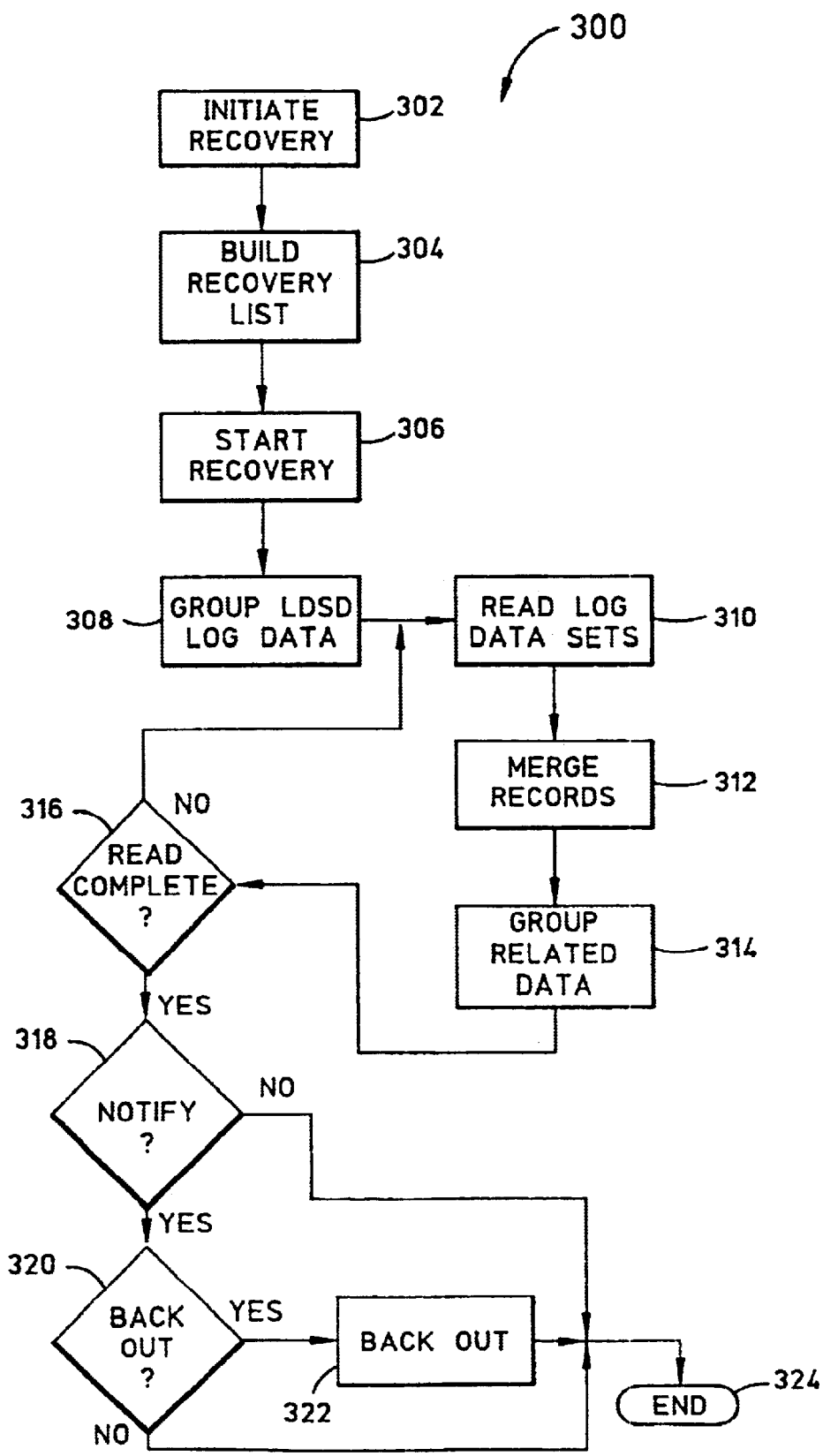
FIG. 3 is a flowchart of an operational sequence for merging log data to recover one or more database data sets in accordance with one embodiment of the invention.

FIG. 3 shows a sequence of method steps 300 to illustrate one example of the method aspect of the present invention. For ease of explanation, but without any limitation intended thereby, the example of FIG. 3 is described in the context of the apparatus 100 and logical configuration 200 described above. The steps are initiated in task 302 as part of a first recovery processing.

Initiation may include preparing the recovery system for operation, for example, by creating a separate address space to manage log data set (LDS) read and/or log record merge processing (as described below), performing internal system checks, initializing memory and devices of required addresses, forming a recovery list, etc. Commands for implementing recovery are executed by the command manager 218 shown in FIG. 2.

A recovery list is a collection of database data sets to be recovered. In one embodiment, when a recovery list is built in task 304, it is associated with a logical terminal that issued the recovery command. Additional recovery commands from that logical terminal operate on the recovery list. For example, to add or remove database data sets from the recovery list. In this embodiment, only one recovery process is allowed to execute in one IMS at a time. To avoid deadlock situations, the user must ensure that recovery data requests executing on other IMSs that would read the same log data set do not execute simultaneously. Regardless of the embodiment, possible recovery list entries are added to a "possibles" list by the DBRM 202. An entry may be an individual database, a database data set (DBDS), or groups of databases or database data sets defined for recovery by a user and stored in REPO 106. Possibles list entries are added to the recovery list for recovery if the entries are validated by the DBRC 206.

Validation may comprise one or more discrete functions. The DBRC 206 may determine whether or not an entry can be found in REPO 106 or whether or not it is in a state that allows it to be recovered. If databases or groups are included in this possibles list, the DBRC 206 determines what database data sets make up the databases or groups. This possibles list of DBDS's is returned to the DBRM 202. If a recovery list already exists for the user running recovery, the possibles list is merged with the existing recovery list. If no existing list for the user is found, the possibles list becomes the recovery list.

Recovery continues in task 306 when the command manager 218 shown in FIG. 2 receives a command to start the recovery and communicates it to the DBRM 202. A check is performed to determine if recovery is currently in process or if a desired recovery list cannot be found. If so, an error message issues and recovery is aborted. Otherwise, recovery continues. If the user chooses to perform a standard time stamp recovery, or recovery to any point in time in task 306, the supplied recovery time is stored by the DBRM 202. The type of recovery selected is also stored. The recovery list and time are passed to DBRC 206.

The DBRC 206 validates the recovery list by ensuring that each DBDS is in a state that allows it to be recovered, and also determines the resources needed for recovery of these validated entries. The resources may include image copy data sets (ICDS) and LDS's. A list of these resources is returned to the DBRM 202, which in turn passes the list to the RDM 204.

The RDM 204 restores the ICDS to the DBs 104. The RDM 204 reads the LDSs 207 in parallel in task 310 subject to the number of available input devices. In another embodiment, the user may specify the number of input devices to be used. The database log records required for recovery are saved in internal storage. These records are merge,d in creation time sequence in task 312 and sent to the DBRM 202 receive component 212 shown in FIG. 2. The receive component passes the records to the router 216. The router maintains tables of log record types indicating which log records are to be passed to the database tracker 220.

If the recovery is to a supplied time stamp (standard time stamp recovery or recovery to any point in time), the RDM 204 stops reading the log records when the time stamp is reached on each log (the set of LDSs created by one IMS). Each log record related to database recovery contains a time stamp. The supplied time stamp is compared with the log record time stamp to determine if the supplied time stamp has been reached. If no time stamp is supplied by the user, the LDSs 207 are read until the LDSs are exhausted.

Point in Time Recovery

Point in time recovery is recovery of database data sets to a user specified time stamp. All committed updates up to and including the specified recovery time are applied to the database data sets in the recovery list in a point in time recovery (PITR). PITR supports traditional time stamp recovery in which the recovery time must be a time at which there are no outstanding update allocations for the database data sets in the recovery list. A user can specify the recovery time as any point in time prior to the current time.

Figure 4C:
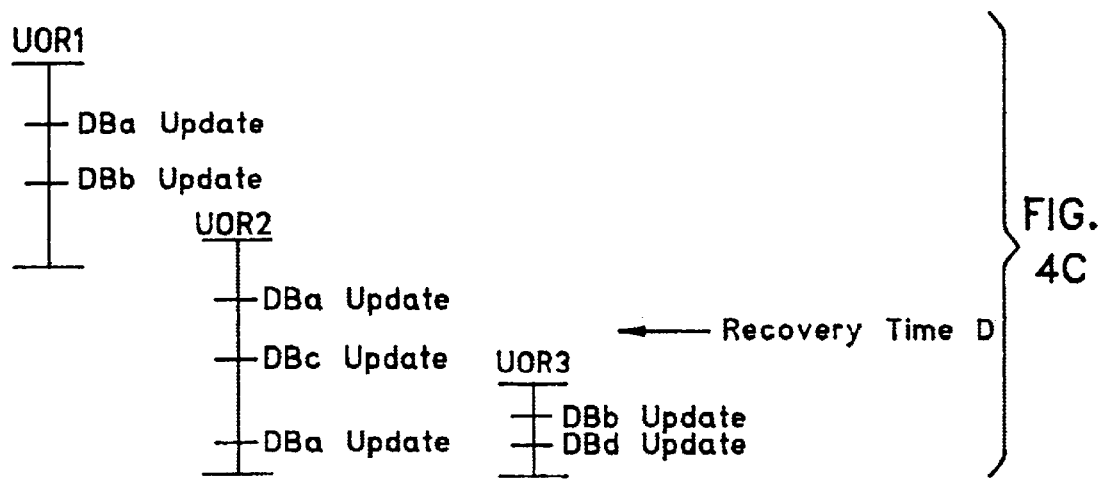
FIG. 4C shows a unit of recovery relative to a recovery time D and is used to explain notification of possible inconsistent database data sets in accordance with one embodiment of the present invention.

PITR allows recovery to any point in time regardless of database allocation boundaries. Only updates that were committed at the recovery time are applied. UORs that end after the specified recovery time will not have their respective database changes applied to the databases data sets on the recovery list. For example, FIG. 4A illustrates three examples of UOR's, that is, updated data in various states of completion relative to a selected recovery time A, B or C. If PITR is performed using recovery time A, no updates will be applied to any database data set on the recovery list because no UOR has completed. Recovery will comprise image copies being restored to the database data sets.

However, if PITR is performed using recovery time B, UOR2 updates will be applied. UOR2 is the only UOR completed and therefore having committed data. If PITR is performed using recovery time C, UOR1 and UOR2 updates will be applied because each has completed and contains committed data.

If a recovery time is not provided by the user in task 306, that is, if point in time recovery is not used, then recovery is to the current time for the database data sets. In either case, the name and type of each database data set, area, database and group in the apparatus 100 is gathered. This information, if included in the recovery list, along with the type of recovery being performed and the time stamp, is reported to the DBRC 206. The DBRC processes this information and returns a list of the resources required for recovery including image copy data sets and log data sets which contain recover) information up to the recovery time, if provided.

In one embodiment, the recovery list may contain database data set names and characteristics, type (i.e., fast path or full function), status, image copy data set name and characteristics, recovery start time, interim recovery intervals to skip log data from prior time stamp recoveries, and a list of IMS identifications that authorized the database data set to be recovered. The log data set list (LDSL) may include a chain of log data set descriptors.

In one embodiment, the LDSL comprises one entry per log data set or volume to be read. The entries are log data set descriptors (LDSD). One LDSD is built for each log volume and is maintained in start time order.

LDSD Grouping

LDSD log data sets are grouped in task 308 according to overlapping allocation ranges and, in one embodiment, assigned an identification (id) by the DBRC 206 according to database data set allocation ranges, and log data set start and stop times. An allocation range is an interval from an earliest allocate time to a latest deallocate time for overlapping allocate and de-allocate times recorded in the REPO 106 for a given database data set. FIG. 4B illustrates one example of allocation (ALLOC) ranges used in one embodiment of the present invention.

In interpreting FIG. 4B, TAx indicates start and stop times for ALLOC ranges; Ax indicates an ALLOC time for an individual database data set; Dx depicts a de-ALLOC time for an individual database data set; and, TLx indicates a log data set start or stop time. Assume that in FIG. 4B a user wants to recover DBDS1 and DBDS2. The concerned database data sets have been updated by both IMSA and IMSB. As shown, log data set 1 is assigned an id of 1 because it is the first log data set to contain an ALLOC record (A1). Log data set 2 is assigned an id of 1 because it contains an ALLOC record (A2) in the TA1–TA2 ALLOC set.

Similarly, log data set 3 is assigned an id of 1 since it contains records from an ALLOC range (TA5–TA6) whose ALLOC record is recorded on log data set 1 (D6). Therefore, log data set 3 is assigned the id of the log data set that contains the ALLOC record.

Log data set 4 has an id of 2 for several reasons. First, it contains records from an ALLOC range from TA7 to TA9. Second, it does not contain records from any ALLOC range whose ALLOC record is recorded on an earlier log data set. Third, the earliest ALLOC time (A7) in any log data set with this id is larger than the latest de-ALLOC time (TA6) for any database data set de-ALLOC record (D6) contained in the log data set with a smaller id.

Lastly, log data set 5 has an id of 2 also for several reasons. First, it contains records from an ALLOC range between TA8 and TA10. Second, it does not contain records from an ALLOC range whose ALLOC record is recorded on an earlier log data set. Third, the earliest ALLOC time (A7) in any log data set with this id is larger than the latest de-ALLOC time (TA6) for any database data set de-ALLOC record (D6) contained in a log data set with a smaller id. Fourth, log data set 5 must have the same id as log data set 4 because it contains an ALLOC record (A8) with a time stamp that is smaller than the de-ALLOC time (D9) on the log data set 4.

In one embodiment, these ids are assigned to log data sets that have an associated LDSD. The ids may be used to prioritize the log data sets for recovery processing.

Ordering LDSDs and Lop Data Sets

The LDSDs are separated by system identification. System identification identifies the IMS that generated the log data described by the LDSD. The LDSDs may be ordered in task 308 based on the ids of their respective log data sets. In another embodiment, ordering may include ordering by priority log start time, data set start time and volume start time if volume start times art available. In one embodiment, the ordered log data sets (or volumes) are read in task 310 and the records related to recovery of the database data sets on the recovery list identified. The log data read is determined by the recovery time used.

The ordered log records read by the RDM 204 are merged in creation time sequence in task 312 as discussed above. In one embodiment, related data are grouped in task 314. If reading of log data sets has completed in task 316, the log records are passed to receive 212 and, in one embodiment, they are merged as they are passed. The router 216 coordinates with the database tracker 220 using routing tables to route the log record recovery data to the DBs 104. If reading has not completed in task 316, further log data sets are read in task 310. When processing of the log data is complete, the tracker 220 is notified by the router 216 so that committed data may be written to the database data sets being recovered. If PITR processing was selected, all database data sets in the recovery list are marked image-copy-required in the REPO 106 after recovery completes. In one embodiment, the user is responsible for starting all databases in the recovery list after the image copies are taken. If, after the recovery time has been reached during PITR, any incomplete UORs contain updates of databases which are not on the recovery list, the user may be notified in task 318 that further recovery may be required. Otherwise, after the data has been processed, the method ends in task 324 until a next recovery command issues.

In one embodiment, database data set updates associated with UORs that were not completed at the time recovery is complete may be backed out in tasks 320 and 322. Backing out these log updates is performed using back out methods such as UNDO which are well known in the data processing art. UNDO processing is discussed at length by Henry Korth and Abraham Silberschatz in "*Database System Concepts*", first edition, McGraw Hill Book Company, 1986.

If the user requests a recovery to any point in time, there may be updates that have been applied to some of the DBDSs within DB 104 that have not been committed. The RDM 204 saves copies of uncommitted updates until a commit or abort (data is to be applied to the DBDSs or backed out of the DB 104) log record is processed for this data in task 320. When the end of data indicator is processed by the RDM 204, all uncommitted updates are converted to backout records in task 320. The backout records are sent to the DBRM 202. The DBRM passes the backout records to a database manager backout component (not shown) which undoes the database changes in task 322 that have not been committed. Once this phase is done, recovery is complete as reflected in task 324.

Unlike the current recovery utilities, the present recovery method operates on a list of database data sets. The recovery list used for recovery may be deleted once the recovery process is finished.

Signal-bearing Media

Such a method may be implemented, for example, by operating the apparatus 100 to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to manage the merging of recovery log data for recovering one or more database data sets and areas in a single pass of the log data sets.

Figure 5:
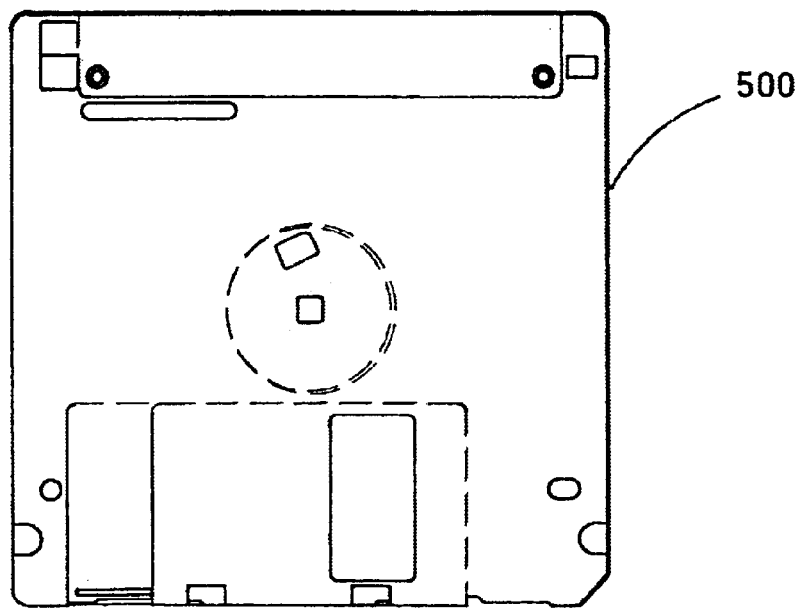
FIG. 5 is a perspective view of an exemplary signal-bearing medium in accordance with the invention.

This signal-bearing media may comprise, for example, RAM (not shown) contained within the storage 110. Alternatively, the instructions may be contained in another signal-bearing media, such as a magnetic data storage diskette 500 shown in FIG. 5, directly or indirectly accessible by the apparatus 100. Whether contained in the apparatus 100 or elsewhere, the instructions may be stored on a variety of machine-readable data storage media. Such media may comprise DASD storage (e.g., a conventional "hard drive" or a RAID array), magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled C-type (e.g., C, C+, C++) language code.

Other Embodiments

While there have been shown what are presently considered to be preferred embodiments of the invention, it will be apparent to those skilled in the art that various changes and modifications can be made herein without departing from the scope of the invention as defined by the appended claims.

What is claimed is:

1. A method for recovering multiple databases in an information management system, the method comprising:
   maintaining log records in parallel from the multiple logs;
   in a single pass:
      reading log records in parallel from the multiple logs; and
      merging the log records in a single log stream in creation time sequence, creation time being the time a log record is entered into a log; and
   recovering the multiple databases substantially simultaneously using the single log stream wherein the amount of time a broken database is unavailable is substantially reduced.

2. The method recited in claim 1, wherein:
   recovering includes using only log records associated with completed units of recovery.

3. The method recited in claim 2, further comprising:
   accepting a recovery time, the recovery time indicating a point in time at which recovery of a database will end; and
   recovering includes using log records until the recovery time is reached.

4. The method recited in claim 3, the method further comprising:
   reading log data sets past the recovery time;
   determining whether a database data set not involved in recovery exists in the log;
   determining whether a unit of recovery not completed during the recovery time updated a database data set not involved in the recovery; and
   notifying that database data sets not being recovered are potentially inconsistent with database data sets being recovered.

5. The method recited in claim 4, wherein the recovery time does not occur at an end of an allocation boundary.

6. The method recited in claim 5, the method including backing-out all updates associated with any unit of recovery that has not completed-prior to the recovery time.

7. A method for recovering databases in an information management system using disaster recovery technology, the method comprising:
   maintaining multiple databases, and multiple logs, each log having log records;
   in a single pass:
      reading log records in parallel from the multiple logs;
      merging the log records into a single log stream in creation time sequence, creation time being the time a log record is entered into a respective log; and
      recovering the multiple databases substantially simultaneously using the single log stream wherein the amount of time a broken database is unavailable is substantially reduced.

8. The method recited in claim 7, further comprising:
   accepting a recovery time, the recovery time indicating a point in time at which recovery of a database will end; and
   recovering includes using log records until the recovery time is reached.

9. The method recited in claim 1, the method further comprising:
   reading log data sets past the recovery time;
   determining whether a database data set not involved in recovery exists in the log;
   determining whether a unit of recovery not completed during the recovery time updated a database data set not being recovered; and
   notifying that database data sets not being recovered are potentially inconsistent with database data sets being recovered.

10. The method recited in claim 9, wherein the recovery time does not occur at an end of an allocation boundary.

11. The method recited in claim 10, the method including backing-out all updates associated with any unit of recovery that has not completed prior to the recovery time.

12. A signal-bearing medium tangibly embodying a program of machine-readable instructions executable by a digital processing apparatus to perform a method for merging log records for recovering a database, the database including one or more databases, said method comprising:
   maintaining log records for the multiple databases at multiple logs;
   in a single pass:
      reading log records in parallel from the multiple logs; and
      merging the log records into a single log stream in creation time sequence, creation time being the time a log record is entered into a log; and
   recovering the multiple databases substantially simultaneously using the single log stream wherein the amount of time a broken database is unavailable is substantially reduced.

13. The signal bearing medium recited in claim 12, the method further comprising:
   recovering includes using only log records associated with completed units of recovery.

14. The signal bearing medium recited in claim 13, the method further comprising:
   accepting a recovery time, the recovery time indicating a point in time at which recovery of a database will end; and
   recovering includes using log records until the recovery time is reached.

15. The signal bearing medium recited in claim 14, the method further comprising:
   reading log data sets past the recovery time;
   determining whether a database data set not involved in recovery exists in the log;
   determining whether a unit of recovery not completed during the recovery time updated a database data set not involved in recovery; and
   notifying that further database data sets not being recovered are potentially inconsistent with database data sets being recovered.

16. The signal bearing medium recited in claim 15, the method further comprising backing-out all updates associated with any unit of recovery that has not completed prior to the recovery time.

17. An information management system to manage merging of log records to recover data, the system comprising:
   multiple databases;
   storage including multiple logs, each log having log records;
   a processor communicatively coupled to the multiple databases and storage, the processor executing commands to recover a database by:

maintaining log records for the multiple databases at the multiple logs;

in a single pass:

reading log records in parallel from the multiple logs; and merging the log records into single log stream in creation time sequence, creation time being the time a log record is entered into a log; and recovering the multiple databases substantially simultaneously using the single log stream wherein the amount of time a broken database is unavailable is substantially reduced.

18. The system recited in claim 17, wherein:

recovering includes using only log records associated with completed units of recovery.

19. The system recited in claim 18, the commands executed by the processor further comprising:

accepting a recovery time, the recovery time indicating a point in time at which recovery of a database will end; and recovering includes using log records until the recovery time is reached.

20. The system recited in claim 19, the commands executed by the processor further comprising:

reading log data sets past the recovery time;

determining whether a database data set not involved in recovery exists in the log;

determining whether a unit of recovery not completed during the recovery time updated a database data set not being recovered; and notifying that further database data sets not being recovered are potentially inconsistent with database data sets being recovered.

21. The system recited in claim 20, the commands executed by the process or further including backing-out all updates associated with any unit of recovery that has not completed prior to the recovery time.

22. An information management system to manage merging of log records to recover data, the system comprising:

storage means for storing data;

multiple log means for storing updates to data stored in the data means;

processor means communicatively coupled to the storage means and the log means, the processor means executing commands to recover a database by:

maintaining log records for the multiple databases at the log means;

in a single pass:

reading log records in parallel from the log means; and merging the log records into a single log stream in creation time sequence, creation time being the time a log record is entered into a log; and recovering the multiple databases substantially simultaneously using the single log stream wherein the amount of time a broken database is unavailable is substantially reduced.

23. The system recited in claim 22, wherein:

recovering includes using only log records associated with completed units of recovery.

24. The system recited in claim 23, the processor executing further commands to recover a database comprising:

accepting a recovery time, the recovery time indicating a point in time at which recovery of a database will end, wherein the recovery time does not occur at an allocation boundary; and recovering includes using log records until the recovery time is reached.

25. The system recited in claim 24, the processor executing further commands to recover a database comprising:

reading log data sets past the recovery time; and determining whether further log data sets remain in the log.

26. The system recited in claim 25, the processor executing further commands to recover a database comprising:

determining whether a database data set not involved in recovery exists in the log;

determining whether a unit of recovery not completed during the recovery time updated the database data set not being recovered; and notifying that database data sets not being recovered are potentially inconsistent with database data sets being recovered.

27. The system recited in claim 26, the processor executing further commands to recover a database comprising saving the further data sets.

28. The system recited in claim 27, the processor executing commands to recover a database including backing-out all data sets associated with any transaction that has not completed prior to the recovery time.

* * * * *